(12) United States Patent
Gelderblom

(10) Patent No.: US 7,835,746 B2
(45) Date of Patent: Nov. 16, 2010

(54) METHOD AND SYSTEM FOR INFORMATION TRANSFER MECHANISM SELECTION IN MOBILE TELEPHONY

(76) Inventor: Antonie Johannes Gelderblom, Tielweg 6, NL-2803 PK Gouda (NL)

( * ) Notice: Subject to any disclaimer, the term of this patent is extended or adjusted under 35 U.S.C. 154(b) by 278 days.

(21) Appl. No.: 10/522,959

(22) PCT Filed: Jul. 22, 2003

(86) PCT No.: PCT/NL03/00536

§ 371 (c)(1),
(2), (4) Date: Dec. 27, 2006

(87) PCT Pub. No.: WO2004/010727

PCT Pub. Date: Jan. 29, 2004

(65) Prior Publication Data

US 2007/0093248 A1     Apr. 26, 2007

(30) Foreign Application Priority Data

Jul. 22, 2002     (NL)     ..................................... 1021127

(51) Int. Cl.
*H04Q 7/20*     (2006.01)
(52) U.S. Cl. ...................... 455/445; 455/418; 455/433; 455/435.1; 455/439
(58) Field of Classification Search .................. 455/445, 455/558, 435.1, 433, 436; 370/353, 465
See application file for complete search history.

(56) References Cited

U.S. PATENT DOCUMENTS 6,330,445 B1 * 12/2001 Skog et al. .................. 455/433
6,631,183 B1 * 10/2003 Rautila et al. ............. 379/88.22
6,738,622 B1 * 5/2004 Stadelmann et al. ...... 455/435.1
6,922,562 B2 * 7/2005 Ward et al. .................. 455/436
2002/0057678 A1 * 5/2002 Jiang et al. .................. 370/353
2002/0068574 A1 * 6/2002 Vestergaard et al. ........ 455/445

FOREIGN PATENT DOCUMENTS

| EP | 1 011 274 A | 6/2000 |
| GB | 2 342 536 A | 4/2000 |
| WO | WO 01 08434 A | 2/2001 |

OTHER PUBLICATIONS

European International Search Report Dated Oct. 14, 2003.

* cited by examiner

*Primary Examiner*—Charles N Appiah
*Assistant Examiner*—Michael T Vu
(74) *Attorney, Agent, or Firm*—Greenberg Traurig LLP

(57) ABSTRACT

The invention relates to a method for providing a mobile telephony application to a mobile communication device (15) in communication with a first network (10), comprising the step of transferring information related to the mobile telephony application. The method comprises the further steps of retrieving data on information transfer mechanism supported by the mobile communication device (15), the first network (10), an the second network (5), selecting an information transfer mechanism supported by the mobile communication device (15), the first network (10) and the second network (5), and initializing the mobile telephony application using the selected information transfer mechanism to relay the information between the mobile communication device (15) and the second network exchange (6). The invention further relates to a mobile communication device (15) arranged to execute the method, and to a SIM card (16).

11 Claims, 4 Drawing Sheets

METHOD AND SYSTEM FOR INFORMATION TRANSFER MECHANISM SELECTION IN MOBILE TELEPHONY

The present invention relates to a method and system for selecting a communication medium in mobile telephony applications, such as calling. More specifically, the present invention relates to a method for providing a mobile telephony application to a mobile communication device in communication with a first network, comprising the step of transferring information related to the mobile telephony application between the mobile communication device and a second network exchange. In a further aspect, the present invention relates to a mobile communication device, or to a SIM card.

Although this method provides numerous advantages in the implementation of the call back method, both economical advantages for the home provider and the user, and advantages in ease of use, the call back method may still be improved. One of the main problems with the described method and other known call back methods, is that they rely on possible signaling or information transfer mechanisms provided by the first network. Often these mechanisms are limited in number, either for technical reasons (both in the first network and in the mobile telephony equipment), or for reasons of agreements between the home provider and the owner of the first network.

The call back method is an example of a mobile telephony application which is very useful for a user of mobile telephony equipment roaming in e.g. a first or visited network. Other mobile telephony applications, whether voice or data, may comprise value added services, such as information numbers, voice mail access, account access or account revaluing. Adding value is usually based on customer knowledge (e.g. profiles, personalized information, unified messaging type of services, secure access to corporate or personal environments, account information), which is not known to the first network, and thus requires interaction with the second network. These value added services all involve the second network exchange. It is often dependent of the capabilities of the first network whether these types of value added services could be provided.

The present invention seeks to provide an improved method for providing mobile telephony applications in visited networks, which does not show the above mentioned disadvantages.

According to the present invention, a method is provided according to the preamble defined above, in which the method comprises the further steps of retrieving data on information transfer mechanisms supported by the mobile communication device, retrieving data on information transfer mechanisms supported by the first network, retrieving data on information transfer mechanisms supported by the second network, selecting an information transfer mechanism supported by the mobile communication device, the first network and the second network, initializing the mobile telephony application using the selected information transfer mechanism to relay the information between the mobile communication device and the second network exchange. By using available information transfer mechanisms automatically depending on which information transfer mechanisms are supported, it is possible to provide user friendly value added services, also when the first or visited network does not support all available information transfer mechanisms of the mobile phone (or vice versa).

The method steps may be implemented in all possible places of the communication network, i.e. implemented in the mobile communication device, or in it's SIM-card, or in an exchange or gateway server connected to the first or second network.

The first and second networks may be geographically separated and e.g. form a visited and home network, respectively. The first and second networks may use the same (e.g. GSM) or different communication standards (e.g. GSM and 3G). Other possible communication standards are GSM/GPRS, 2G and WLAN. The present method may then be applied when e.g. a user of the mobile communication device is roaming. Also, the present method may be advantageously used in a situation where a network provider has a mixed network: the first network may then e.g. be a 3G network which is only available with a limited geographical coverage and the second network may be a GSM/GPRS network with a more extensive geographical coverage. Using the method, the best available medium may be selected automatically.

In a further embodiment, the information transfer mechanisms are prioritized, and the information transfer mechanism allowed by the mobile communication device, the first network and second network having the highest priority is selected. This allows having a preferred information transfer mechanism, e.g. the one which is the most reliable, the most robust or the cheapest alternative. Prioritization may be executed by all parties involved, or by other triggers, such as quality of the connection or available capacity.

The information transfer mechanism may in a particular embodiment comprise one or more of the group of Dual Tone Multiple Frequency; Direct Dial In; Unstructured Supplementary Services Data; Short Message Service. These kind of mechanisms are widely used today and are fully known to the person skilled in the art. However, the present method is also suitable for any possible future information transfer mechanism.

As a specific embodiment, the mobile telephony application is a call back application allowing establishment of a connection between the mobile communication device and a further mobile communication device by intervention of the second network exchange. The step of initializing comprises the steps of a) transferring a request for call back, the number to be called associated with the further mobile communication device and the number of the mobile communication device to the second network exchange, b) accepting the call from the second network exchange to establish the connection. According to this embodiment, a call back service may be provided by a home network provider which will be able to provide the call back service in a very large number of visited networks.

When the information transfer mechanism is DTMF, the step of transferring may comprise the steps of a1) sending a request for call back to the second network exchange, a2) after receiving a call back form the second network exchange, accepting the connection and transferring the number to be called to the second network exchange using DTMF, and a3) waiting for the connection to be established by the second network exchange. DTMF has very limited infrastructure requirements, is supported in almost every network.

When the information transfer mechanism is USSD or SMS, the step of transferring may comprise the steps of a1) sending the request for call back, the number to be called and the mobile communication device identification number to the second network exchange, in which at least the number to be called is comprised in a USSD message, or a SMS message, respectively, and a2) waiting for the connection to be established by the second network exchange. USSD is supported in a growing number of networks, also when roaming a visited network, but not in every mobile phone in use. SMS is an information transfer mechanism supported in almost every network and almost every mobile phone in use today.

In a further embodiment of the present invention, the method may comprise the further step of detecting a start event by checking one or more characteristics of a number entered on the mobile communication device. The characteristics e.g. comprise the number of digits, or a special sequence of digits. Using this embodiment, the input of a 10 digit (international) number may indicate a request to initiate a mobile telephony application, e.g. the call back application. Also, it may be checked whether the number is a number associated with a Virtual Private Network (VPN), which would also initiate a special mobile telephony application, such as the call back application. Also, it is possible to provide a list of exception numbers (e.g. emergency call numbers, or numbers associated with the home provider) for which the mobile telephony application will not be used.

In a further aspect, the present invention relates to a mobile communication device, such as a mobile phone, comprising processing means and memory means connectable to the processing means, in which the processing means are arranged to execute the steps of the present method. Preferably, the memory means comprise a SIM card. Such a phone would provide a user with the possible advantages mentioned above with relation the method for providing a mobile telephony application.

In an even further aspect, the present invention relates to a SIM card comprising a software application, which, when inserted into a mobile communication device, provides the mobile communication device with the functionality of the present method. Such a SIM card may include e.g. an applet which may be executed on a mobile telephony to provide the mobile telephony application. Usually, the home network provider furnishes the SIM card to its clients, and can thus control the number of and extent of mobile telephony applications available for a user of a mobile phone.

BRIEF DESCRIPTION OF THE DRAWINGS

The present invention will now be explained in further detail using an exemplary embodiment of the invention, with reference to the drawings, in which.

DETAILED DESCRIPTION

Figure 1:
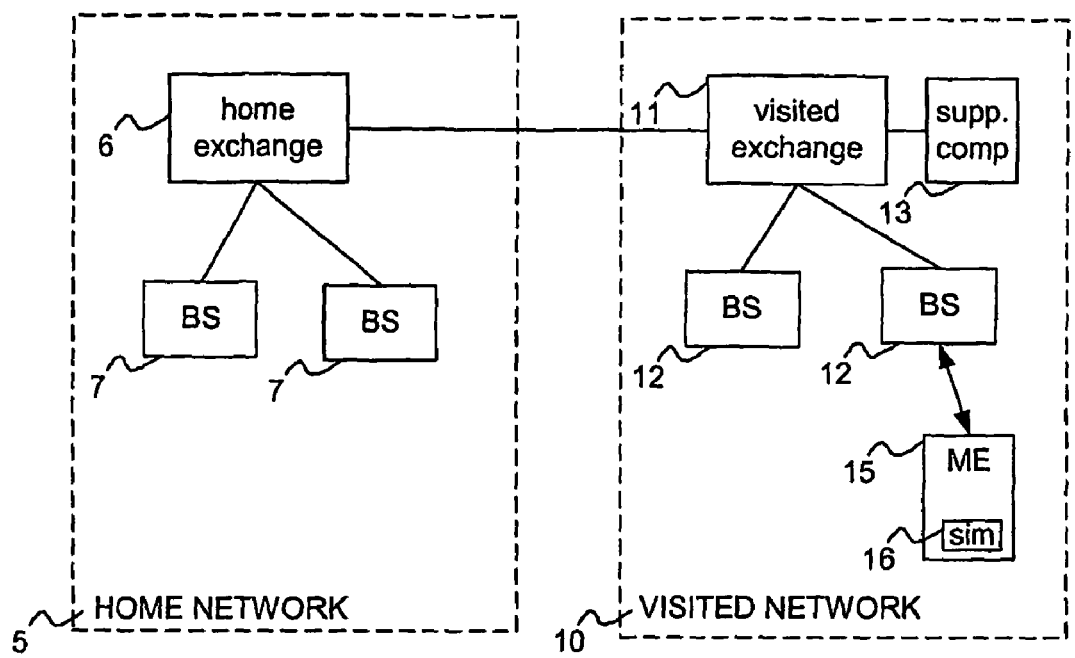
FIG. 1 shows a schematic view of a mobile phone roaming in a visited network.

The present invention is discussed in more detail using the call back function as an example of a mobile telephone application or service which is to be provided in a first, e.g. a visited network 10. FIG. 1 shows a schematic view of a second, e.g. a home network 5, associated with the mobile communication device or mobile phone 15 of a user, which is roaming in the visited network 10. The home network 5 comprises a home (second) network exchange 6 and a large number of base stations 7 connected to the home network exchange 6, which base stations 7 provide a geographical RF coverage area for the home network 10. The home network exchange 6 is arranged to set up calls, but also to provide value added services or mobile telephony applications to the mobile phone 15, such as information service, voice mail access, account information, or account revaluing. The visited network 10 also comprises at least one exchange 11, connected to a number of base stations 12, which allow an RF connection with the mobile phone 15. The exchange 11 of the visited network 10 may be arranged to provide support for the mobile telephony applications. Alternatively, this is implemented using a separate support computer 13, and the exchange 11 may then be dedicated to pure exchange functions.

The call back functionality (or any other desired value added service functionality) may be implemented as a software application in the mobile phone 15, preferably as an applet in a SIM card 16. The SIM card 16 may be supplied separate from the mobile phone 15, and is arranged to interact with the mobile phone 15 circuitry. In this manner, the home network provider, which controls the dissemination of SIM cards 16, can control which mobile telephone applications are available for a certain user. As an alternative, the method is implemented in an exchange or gateway server of the first or second network, or the method is implemented in a distributed manner.

Figure 2:
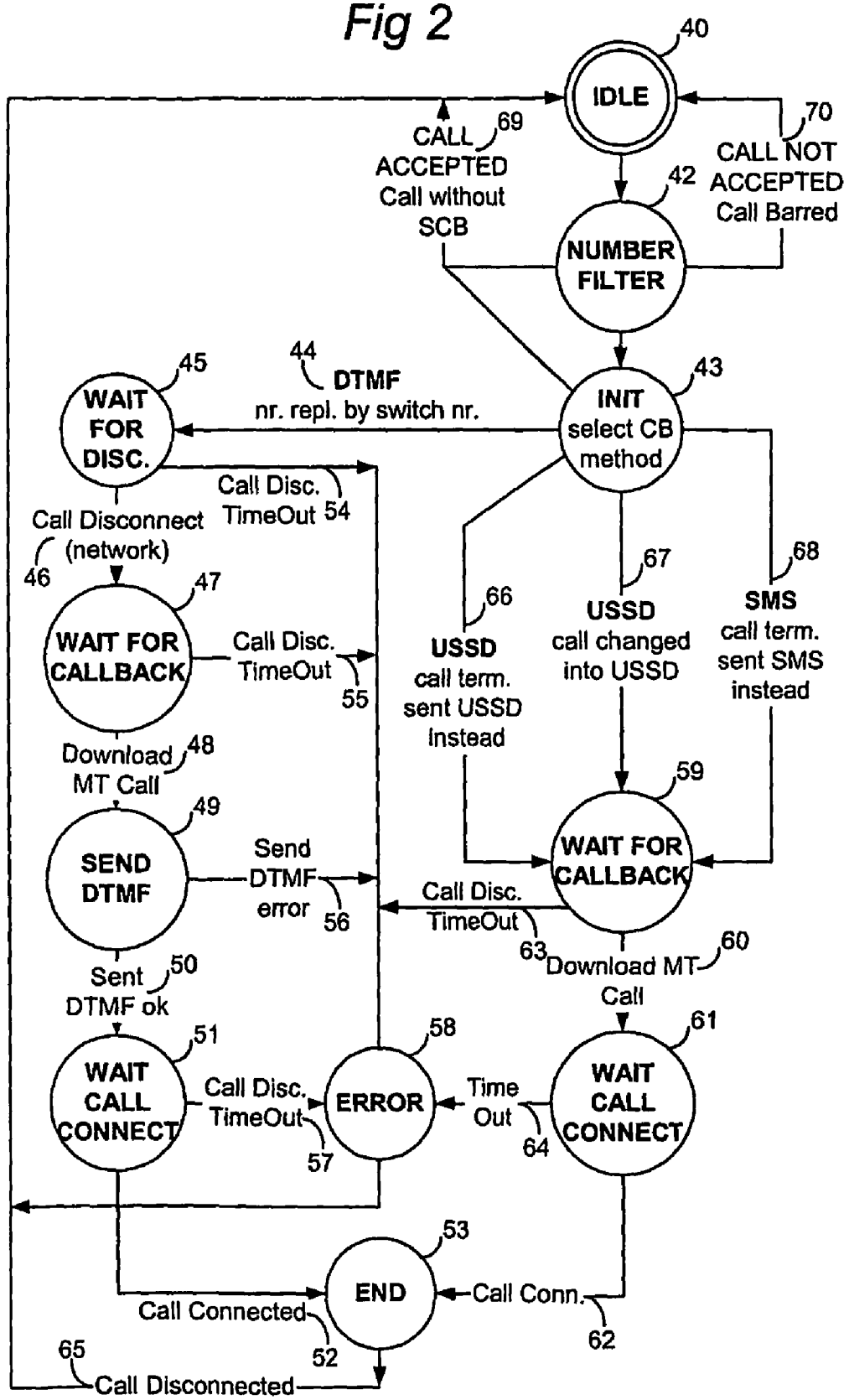
FIG. 2 shows a state diagram of a call back application implementing an embodiment of the present invention.

FIG. 2 shows a state diagram of the call back application as implemented in an embodiment of the present invention. Normally, the application is in an idle state 40. When the mobile phone 15 notifies the application that the user has started a call (by entering a number using the mobile phone 15 keypad), e.g. using an event trigger, the application enters the number filter state 42. The event trigger may be a call control event (when the mobile phone 15 is properly equipped for notifying call control events to the call back application), or a menu selection event.

The function of the number filter state 42 is discussed in more detail below with reference to FIG. 5, here it suffices to indicate that the number filter state 42 may be exited to re-enter the idle state 40 when the call is accepted as a normal call (event 69), or when a call is not accepted (event 70, call barred).

After exiting the number filter state 42 having determined that the call back application is desired by the user, the application enters the initialization state 43. In the initialization state 43, the call back application will determine which information transfer mechanism is to be used for the call back execution. This will now first be discussed with reference to FIG. 3.

Figure 3:
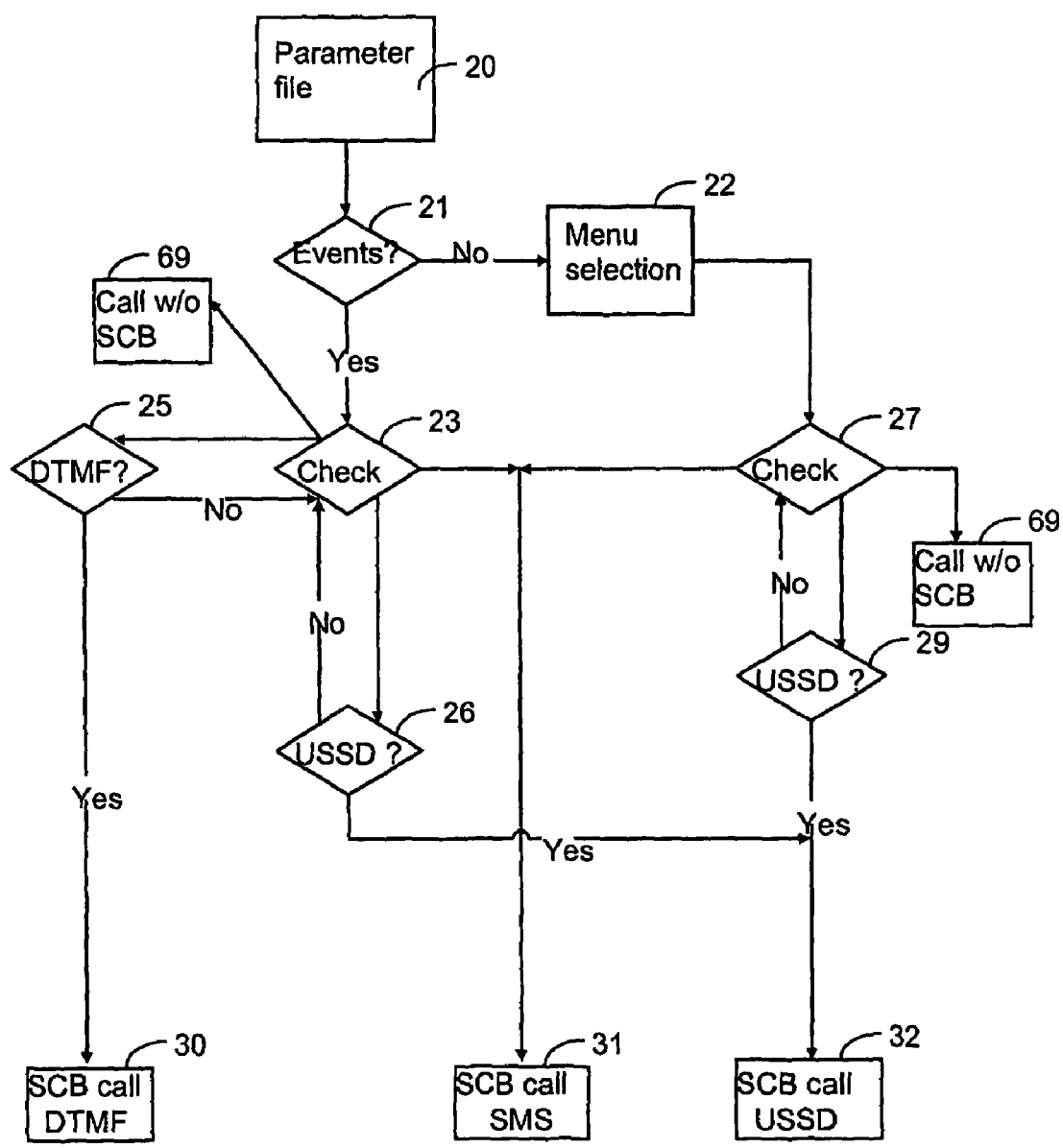
FIG. 3 shows a flow diagram of an initialisation part of the call back application of FIG. 2.

FIG. 3 shows a flow diagram of the initialization state 43 according to an embodiment of the present invention, in which three possible information transfer mechanisms between mobile telephone 15 and the exchange 11 of the visited network 10 are checked. The three information transfer mechanisms in this illustrative embodiment are Dual Tone Multiple Frequency (DTMF), Unstructured Supplementary Service Data (USSD) and Short Message Service (SMS). These mechanisms are well understood by the person skilled in the art, and are thus not further discussed.

In the mobile phone 15, the mobile phone capabilities regarding support for any of the three information transfer mechanisms is stored in a mobile phone 15 memory, preferably present on a part of the SIM card 16, as indicated by general parameter file 20.

In decision block 21, a check is performed whether the mobile phone 15 is capable of sending control signals directly to the call back application, triggered by events. If this is possible, the information transfer mechanism to be used may be determined automatically in the call back application (see below). If this is not possible, the user will have to initiate the call back application using a menu selection 22.

When the mobile phone 15 is capable of direct event signaling, the flow continues with decision block 23, in which the available back end systems, i.e. the capabilities of the exchange 11 of the visited network 10, are checked. This data concerning the exchange 11 may be broadcast by the exchange 11, stored in the mobile phone 15 and updated when necessary. It is also possible that the home network provider stores these data on the SIM card 16 for visited networks 10 for which the provider has an agreement with the visited network provider to allow the value added services, such as the call back application. The possible information transfer mechanisms may be given a priority, and the information transfer mechanism supported by both the mobile phone 15 and the exchange 11 having the highest priority will be selected.

If the exchange 11 does not support any information transfer mechanism, the initialization state 43 is exited and the call is handled as a normal call, i.e. the call is handled by the exchange 11 of the visited network 10, as indicated by block 69 (see also FIG. 2). If the exchange 11 supports one or more information transfer mechanisms, the various possibilities may be checked in random order, or by priority. Alternatively, e.g. depending on the priority or home operator selection, the call may be blocked.

E.g., in FIG. 3, it is first checked in decision block 23 whether USSD is supported by the exchange 11. If not, the flow continues in decision block 23 to check for further possibilities. If USSD is supported by the exchange 11, it is subsequently checked in decision block 26 whether the mobile phone 15 supports USSD. If not, the flow again returns to decision block 23. If USSD is supported both by mobile phone 15 and exchange 11, the call back application is further executed using USSD (see below), as indicated by block 32.

The same applies for the mechanism using DTMF for signaling: after a check in decision block 23 whether the exchange 11 supports DTMF, decision block 25 checks whether the mobile phone 15 supports DTMF, and if so, the call back application is executed using DTMF, as indicated by block 30. Also, the possible use of SMS is checked in decision block 23 for the exchange 11, and if supported the call back application is executed using SMS, as indicated in block 31. In the flow of FIG. 3, the check whether the mobile phone supports SMS is left out, as the majority of the mobile phones in use today support the use of SMS. Of course, such a check can be included similar to the decision blocks 25, 26.

When the mobile phone 15 does not support direct signaling to the call back application, as indicated by block 22, the right side of the flow schedule of FIG. 3 is used. Information is then received by means of user input, e.g. using a menu selection mechanism. Here, also a check is performed on available information transfer mechanisms of the exchange 11 (decision block 27), which may result in a normal call (block 69, see also FIG. 2) when no mechanism is supported, a further check on USSD capability of the mobile phone (decision block 29) and subsequent use of USSD (block 32), or use of SMS (block 31). DTMF support is in this case not possible, as this requires the capability for direct event signaling (call control features).

Figure 4:
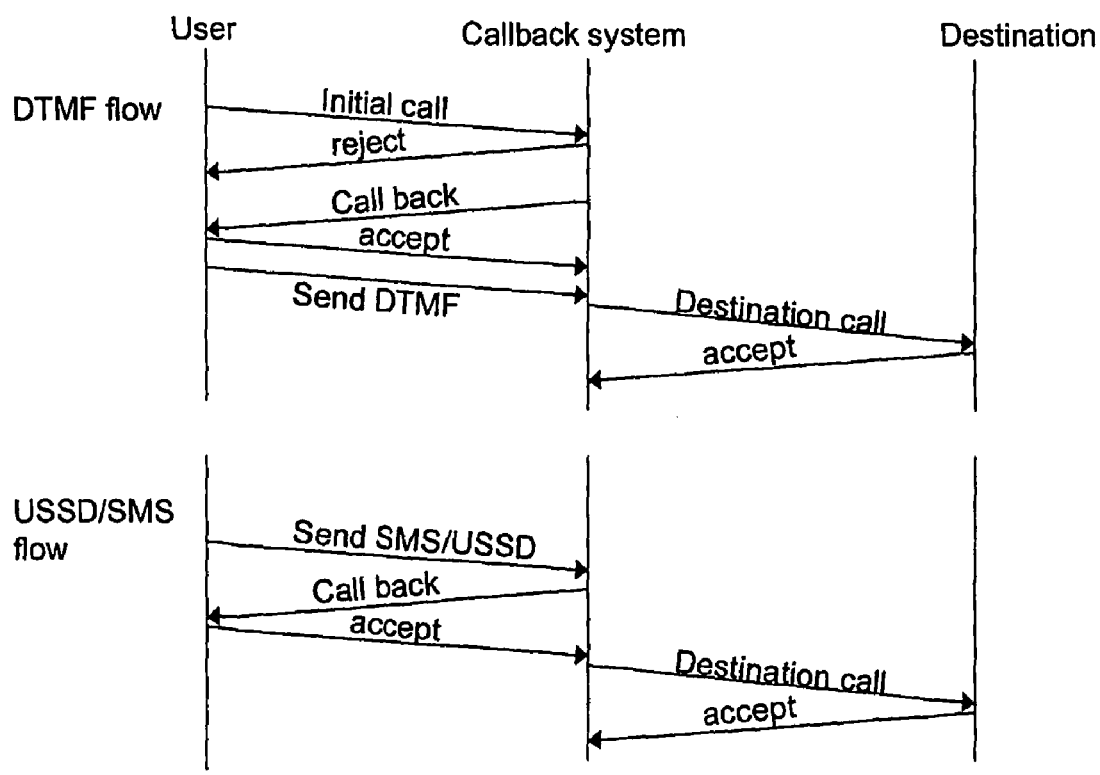
FIG. 4 shows a timing diagram of the call back application of FIG. 2.

Returning to FIG. 2, and further referring to the timing diagram of FIG. 4, the further state transitions of the call back application are discussed.

In FIG. 4, the timing is shown for the information exchange between user mobile telephone 15 and the destination (which may be a mobile phone, or a land line number), in which the total connection is set up by the home exchange 6. A distinction is made between the use of DTMF on one side and USSD/SMS on the other side as transfer mechanism.

When DTMF is used, it is not possible to convey much information without actually establishing a connection between the mobile phone 15 and the home provider exchange 6. Such a connection would encompass cost for a call, which would make the method less advantageous. Therefore, a call back application using DTMF will follow the following steps:

First, the mobile phone 15, of which the user initiates a call back request, will place an initial call to the home exchange 6 (event 44 in FIG. 2: the called number will be exchanged by the mobile phone circuitry for the home exchange 6 number) using a specific number and enter a waiting state 45, The exchange 6 will reject the call (call disconnect event 46 in FIG. 2), but at the same time obtain information on the mobile phone number (A-number, e.g. using Calling Line Identification, CLI) and the call back application will enter a further wait state 47, waiting for a call back by the home exchange 6. The specific number dialed by the mobile phone 15 to reach the home exchange 6 will convey the information that a call back is requested.

Alternatively, a method called Direct Dial In (DDI) may be used. The number used to reach the home network exchange 6 can then be the mobile phone number or a shadow number, such as the voice mail number. The home exchange 6 can then extract the information that a call black is requested and the mobile phone number. The next step is that the exchange 6 will initiate a connection with the mobile phone 15 (event 48). Subsequently, in state 49, the mobile phone retrieves the number to be called (B-number) from its memory and transfers this to the exchange 6 using DTMF signals. The exchange 6 acknowledges correct reception of the DTMF message (event 50), and the call back application enters the Wait for call connect state 51. Then, the home exchange 6 establishes a connection with the number to be called (B-number), and when this is accepted, the complete connection between the mobile phone 15 and the number to be called is established (event 52), after which the call back application enters the End state 53. When the call is disconnected (either by mobile phone 15 or the called person) the call back application returns to the idle state 40.

As indicated in FIG. 2, a number of error situations may occur in each of the states 45, 47, 49, 51, either by timing out a waiting period (54 ... 56), or by error detection (event 57), after which the call back application enters an error state 58, to eventually return to the idle state 40.

When the call back application is executed using USSD or SMS, the call set-up may be much simpler. The mobile phone 15, when triggered by the user to initiate a call back, will send a SMS or USSD message to the home provider exchange 6 (events 66, 67, 68 in FIG. 2, followed by a transition to the Wait for call back state 59). This message comprises an indication that a call back is requested, and both the number to be called and possibly the number of the mobile phone 15 (this may also be retrieved using e.g. Calling Line Identification, CLI), which information is transferred to the home exchange 6. Subsequently, the home exchange 6 establishes a connection with the mobile phone 15, and awaits acceptance of the call (event 60 in FIG. 2, after which the call back application enters the Wait for connect state 61). Then, the connection to the number to be called is established, after acceptance of which the complete connection is established (event 62), and the call back application enters the end state 53. It will be apparent to the person skilled in the art, that it is also possible to set up the call to the mobile phone 15 and the number to be called (B-number) simultaneously.

For the information to be transferred in the respective messages, a number of possible alternatives may be envisaged. In case of DTMF (send DTMF state 49 in FIG. 2), a start sequence code is included to prevent loss of relevant information during the transmission of the DTMF sequence. The start sequence code may comprise a number of digits followed by a '*'. The general application parameter file 20 may comprise a parameter (Number of start sequence digits) for the number of digits. E.g., if the parameter is set to six, the start sequence code can be '54321'. The home network exchange 6 will only recognize a valid DTMF sequence of the number to be called after receiving and verifying the start sequence code.

In the general application parameter file 20, the parameters MCC (Mobile Country Code) in DTMF and MNC (Mobile Network Code) in DTMF may be included to indicate whether the MCC, both MCC and MNC or neither have to be included in the DTMF sequence as a location code. When it should be included, it is done at the end of the DTMF sequence, followed by a '#'. E.g., Netherlands, Telfort is included as '20412'. The total DTMF sequence will then be <start sequence>*<destination number>*<location code>#

In case of use of USSD, a USSD message is formed, which as defined in standards, starts with an '*' and ends with an '#'. The format of the message may e.g. be
*<node id>*<destination number>*<location code>#, in which 'node id' is an identification of the home exchange 6 assigned by the home network provider, which may be stored in the general application parameter file.

When the mobile phone 15 is properly equipped, the dialed number can be automatically translated into the USSD message (event 67 in FIG. 2). Otherwise, the call back application may be arranged to intercept the call by the user of the mobile phone 15 and send the USSD message as described above (event 66 in FIG. 2).

In case SMS is used for the call back application, the call is initiated by the mobile phone 15 by sending an SMS to an SMS exchange of the home network (which may be co-located with the home network exchange 6). The SMS message is structured as follows:
<destination number>*<location code>#

The SMS destination number and the location code may be stored in the application general parameters file 20.

Figure 5:
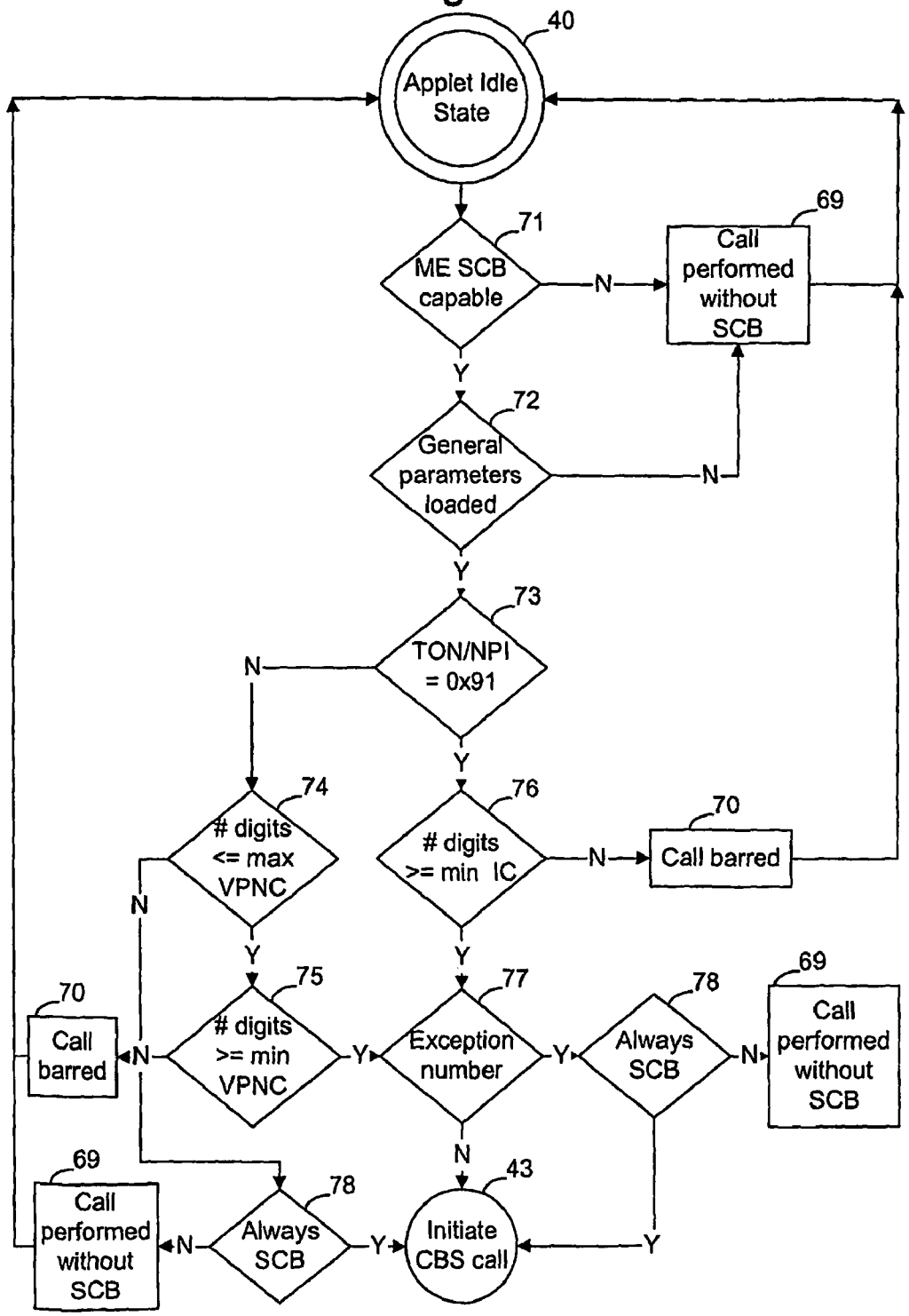
FIG. 5 shows a flow diagram of a number filter algorithm as applied in the call back application of FIG. 2.

In FIG. 5, a flow diagram is shown of a possible implementation of a number filtering algorithm as executed in the number filter state 42 (see FIG. 2), which detects whether a user of the mobile phone 15 wants to use the call back application, or to place a normal call. The number filtering algorithm is preferably stored in the SIM card 16 of the mobile phone 15, and is part of the call back application.

The number filtering algorithm may prevent errors and illegal calls by checking the number entered by the user, before the call is initiated. First, it is checked whether the mobile phone 15 is capable of executing the call back application (decision block 71) and then it is checked whether the general parameters file is downloaded to the application (decision block 72). When either of these decisions is negative, the call is performed without using the call back application (block 69, see also FIG. 2).

Then, in decision block 73, it is checked whether the number entered by the user on the mobile phone 15 comprises a Type of Number/Number Plan Identification (TON/NPI) byte which is equal to 0x91, which indicates the number is an international number. If not, it is checked in subsequent decision blocks 74 and 75 whether the number entered satisfies the characteristics of a virtual plan numbering (VPN), which is determined by checking whether the number entered comprises between a minimum and maximum amount of digits (e.g. three or four digits). If the entered number has less than the minimum number of digits required for a VPN number, the call is barred (block 70). If the TON/NPI byte is equal to 0x91, it is checked in decision block 76 whether the number entered comprises a minimum number of digits required for an international call. If the number of digits is less than the required number, the call is barred (block 70).

If the entered number satisfies the criteria of a VPN number or an international number, a further check is made on whether the number entered is an exception number (decision block 77). Exception numbers may be included in the general parameter file 20, and may include emergency calls. Also, the exception number may include a table of records, each containing country or network identifiers, indicating visited networks 10 in which calls will not be made using the call back application. This enables the home network provider to control the use of the call back application in the context of his policy and agreements with other network providers. By default only the home network 5 is part of the exception table.

When the number entered is an exception number (block 77) or the number entered has less than the number of digits required for a VPN (block 74), the number filtering algorithm may comprise a further check on a parameter which indicates that the call back application should always be used (decision blocks 78). If this is the case, or when the entered number is not an exception number (decision block 77), the number filtering algorithm will initiate the call using the call back application as described above and enter the initialization state 43 (see also FIG. 2). If not, the number filtering algorithm will indicate that the call is to be performed without the call back application (block 69).

The invention claimed is:

1. A method for providing a mobile telephony application to a mobile communication device in communication with a first network, comprising the step of transferring information related to the mobile telephony application between the mobile phone and a second network exchange, wherein the method comprises the further steps of:

retrieving data on information transfer mechanisms supported by the mobile communication device;

retrieving data on information transfer mechanisms supported by the first network;

retrieving data on information transfer mechanisms supported by the second network;

selecting an information transfer mechanism supported by the mobile communication device, the first network and the second network;

initializing the mobile telephony application using the selected information transfer mechanism to relay the information between the mobile communication device and the second network exchange;

wherein the selected information transfer mechanism comprises one or more of the group of Dual Tone Multiple Frequency; Direct Dial In; Unstructured Supplementary Services Data; Short Message Service, and wherein the mobile telephony application is a call back application allowing establishment of a connection between the mobile communication device and a further mobile communication device by intervention of the second network exchange, in which the step of initializing comprises the steps of:

transferring a request for call back, the number to be called associated with the further mobile communication device and the number of the mobile communication device to the second network exchange; and accepting the call from the second network exchange to establish the connection.

2. The method according to claim 1, in which the first and second networks are geographically separated.

3. The method according to claim 1, in which the first and second networks use different communication standards.

4. The method according to claim 1, in which the information transfer mechanisms are prioritized, and the information transfer mechanism allowed by the mobile communication device, the first network and the second network having the highest priority is selected.

5. The method according to claim 1, in which the information transfer mechanism is DTMF, and the step of transferring comprises the steps of:

sending a request for call back to the second network exchange;

after receiving a call back form the second network exchange, accepting the connection and transferring the number to be called to the second network exchange using DTMF; and waiting for the connection to be established by the second network exchange.

6. The method according to claim 1, in which the information transfer mechanism is USSD or SMS, and the step of transferring comprises the steps of:

sending the request for call back, the number to be called and the mobile communication device identification number to the second network exchange, in which at least the number to be called is comprised in a USSD message, or a SMS message, respectively; and waiting for the connection to be established by the second network exchange.

7. The method according to claim 1, in which the method comprises the further step of detecting a start event by checking one or more characteristics of a number entered on the mobile communication device.

8. The method according to claim 7, in which the characteristics comprise the number of digits, or a special sequence of digits.

9. The method communication device comprising processing means and memory means connectable to the processing means, in which the processing means are arranged to execute the steps of the method according to claim 1.

10. The method communication device according to claim 9, in which the memory means comprise a SIM card.

11. The SIM card comprising a software application, which, when inserted into a mobile communication device, provides the mobile communication device with the functionality of the methods according to claim 1.

* * * * *